Figure 8:
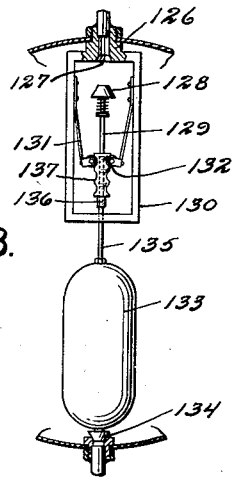

Sept. 1, 1931.  T. K. MARBURY  1,821,812
ABSORPTION REFRIGERATION APPARATUS AND SYSTEM
Filed April 21, 1928  3 Sheets-Sheet 1
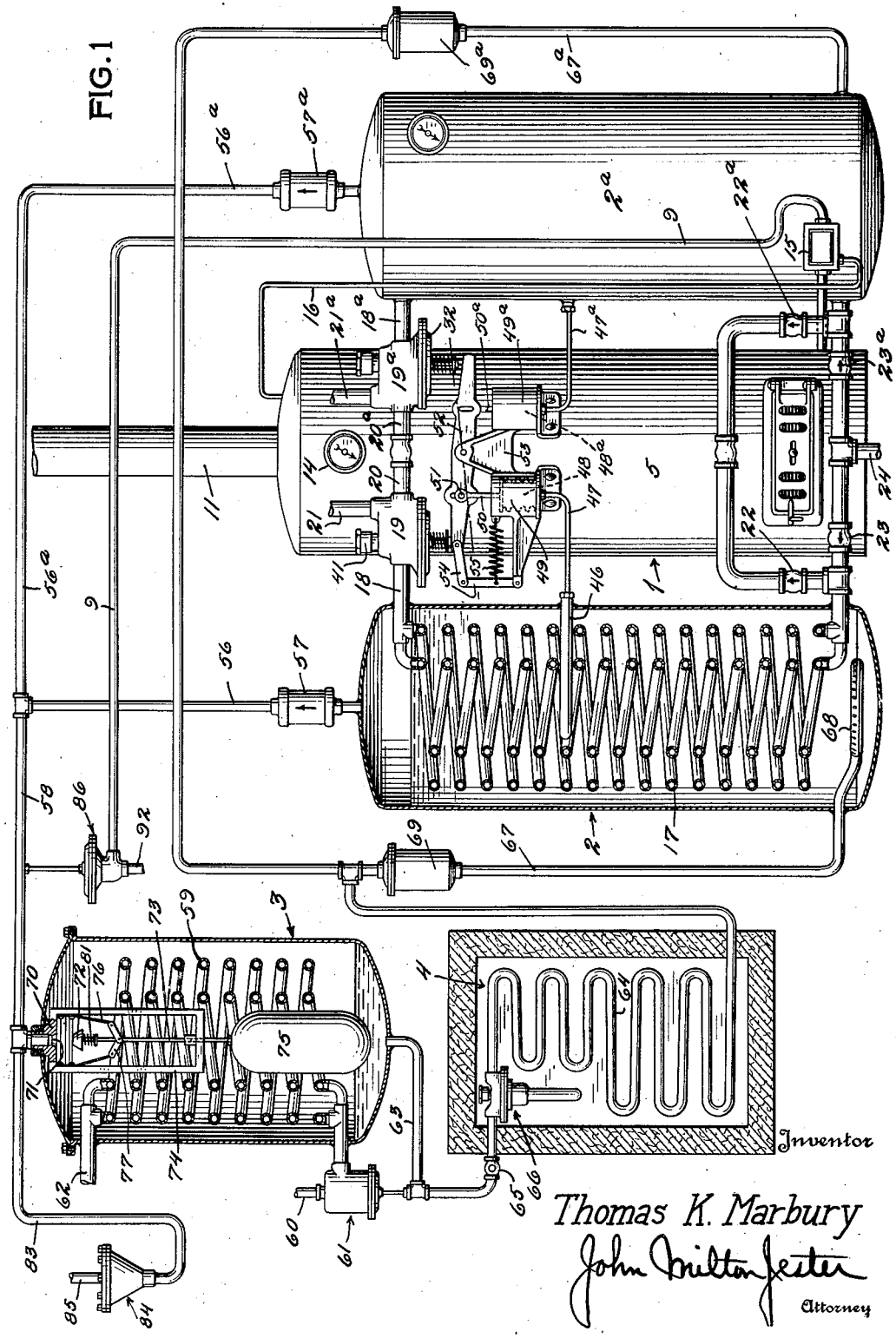
Inventor
Thomas K. Marbury
John Milton Jeter
Attorney Sept. 1, 1931. T. K. MARBURY 1,821,812
ABSORPTION REFRIGERATION APPARATUS AND SYSTEM
Filed April 21, 1928 3 Sheets-Sheet 2
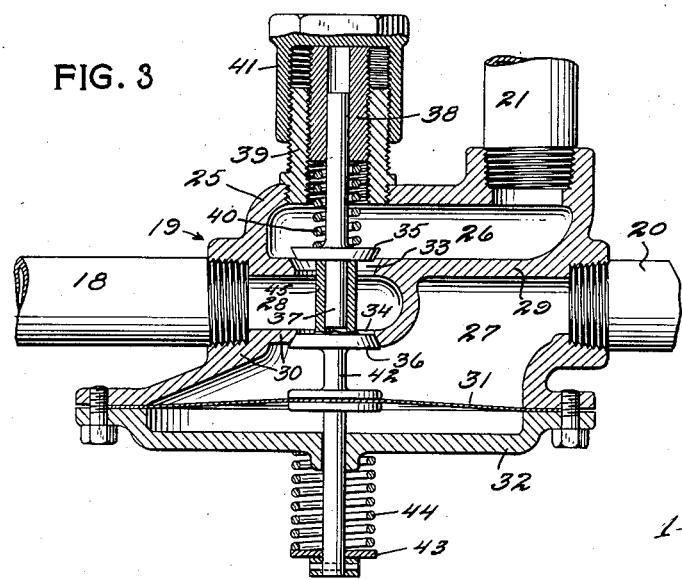
FIG. 3
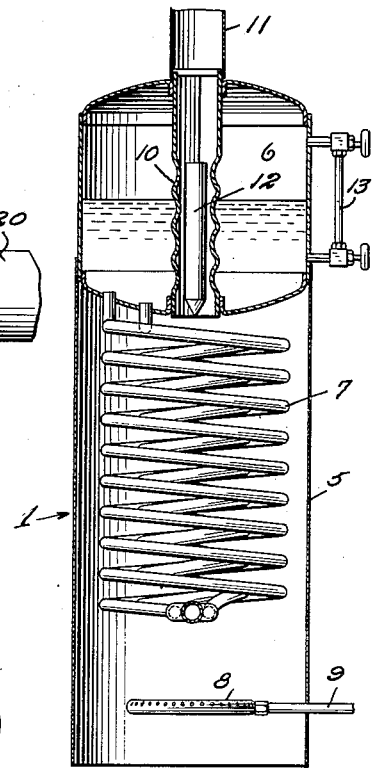
FIG. 2
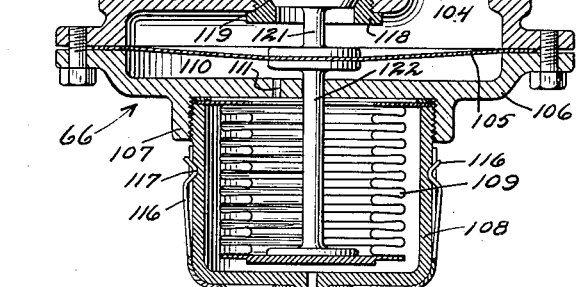
FIG. 4
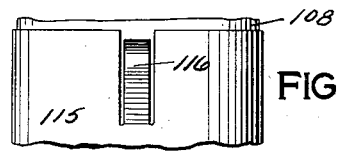
FIG. 5
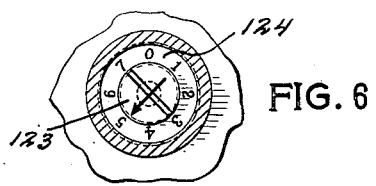
FIG. 6
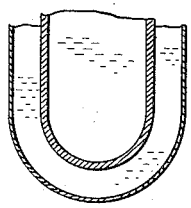
Inventor
Thomas K. Marbury
By John Milton Jester
Attorney Sept. 1, 1931.  T. K. MARBURY  1,821,812
ABSORPTION REFRIGERATION APPARATUS AND SYSTEM
Filed April 21, 1928  3 Sheets-Sheet 3

Inventor
Thomas K. Marbury
By John Milton Jester
Attorney

Patented Sept. 1, 1931

1,821,812

UNITED STATES PATENT OFFICE

THOMAS K. MARBURY, OF MERIDIAN, MISSISSIPPI

ABSORPTION REFRIGERATION APPARATUS AND SYSTEM

Application filed April 21, 1928. Serial No. 271,852.

The invention relates to refrigeration and has special reference to a system and apparatus embodying the absorption principle.

The principal object of the invention, generally stated, is to provide an absorption refrigerating system and apparatus of the intermittent type, certain units or parts being so arranged as to operate in alternation whereby the final result will be a continuous action.

An important object of the invention is to provide an apparatus of this character which may be operated entirely by heat derived preferably from gaseous fuel, various instrumentalities being provided for automatically controlling the fuel supply in accordance with the demands of the system.

An important object of the invention is to provide a system and apparatus of this character embodying two generators adapted to operate in alternation, one being cooled and acting as an absorber while the other is being heated to drive off ammonia gas which after completing its cycle is absorbed into the generator which is being cooled and which therefore acts as an absorber, the invention further including a valve system which is thermostatically operated for controlling the flow of heating means through the generators and the flow of cooling means therethrough when they act as absorbers.

A more specific object of the invention is to provide an apparatus of this character in which each of the devices which operate at one time as generators and at another time as absorbers is provided with a single coil through which hot water is passed during one portion of the operation for driving off the ammonia gas, and through which cold water is passed during another portion of the operation for cooling the spent solution and causing it to absorb the gas, the thermostatic operating means controlling peculiarly constructed valve means for producing or permitting a desired flow.

Another specific object of the invention is to provide a control valve mechanism for the flow of hot and cold water, this valve mechanism being enclosed within a single casing or body so as to reduce the number of different parts required in the entire assembly.

A very important object of the invention is to provide means associated directly with and located within the condenser for preventing flow thereinto of a greater quantity of ammonia gas than is required in accordance with the demands of the system, a relief valve means being also provided in association with the gas conducting pipe in advance of the condenser for relieving excess pressure and thereby preventing injury to the apparatus.

Another feature is the provision of a float operated valve mechanism in the condenser operating in accordance with the level of the liquefied gas therein for controlling the admission of ammonia gas in accordance with the demands of the system, the valve being peculiarly constructed so as to have a snap action.

A further object is to provide means connected with the ammonia gas line in advance of the condenser and operating in response to the building up of pressure therein as the result of closing of the float valve mechanism in the condenser whereby to regulate the flow of fuel gas to the burner of the heating system so that the liberation of the ammonia gas in the generators will be governed by the demands of the system.

A still further object is to provide another form of control device in the condenser for not only regulating the inflow of ammonia gas thereto but also to control the outflow of liquefied gas to the expansion valve, both functions being accomplished by the same mechanism.

Another object is to provide an auxiliary thermostatically operated valve within the refrigerating chamber responsive to changes in temperature therein for the purpose of controlling passage of gas through the expansion coil so that the temperature may be maintained uniform, adjusting means being provided in association therewith.

An additional object is to provide an apparatus of this character which will be comparatively simple to construct, easy to assemble and install, positive and economical in action, efficient and durable in service, and a general improvement in the art.

Figure 9:
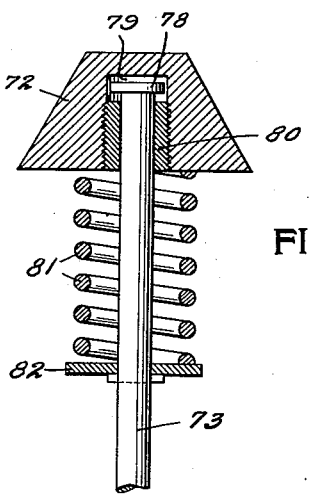
Figure 7:
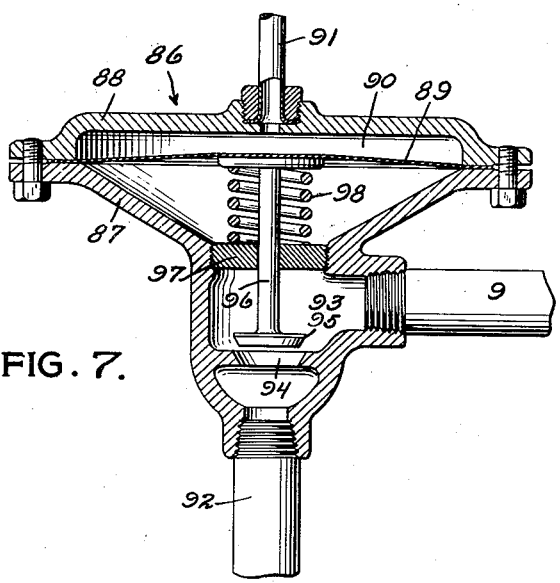

To the attainment of the foregoing and other objects and advantages, the invention preferably consists in the details of construction and the arrangement and combination of parts to be hereinafter more fully described and claimed, and illustrated in the accompanying drawings in which:

Figure 1 is a view mostly in elevation and partly in section showing the entire apparatus, Figure 2 is a vertical longitudinal section through the heating unit, Figure 3 is a longitudinal section through the combination valve for controlling the flow of hot or cold water through the combined generators and absorbers, Figure 4 is a vertical sectional view through the auxiliary valve device located in the gas line in the refrigerating chamber, Figure 5 is a fragmentary side elevation thereof, Figure 6 is a detail cross section taken on the line 6—6 of Figure 4 and illustrating a modification, Figure 7 is a detail section illustrating the fuel gas control valve, Figure 8 is an elevation of a modified valve structure used in the condenser, Figure 9 is a detail section through the upper end thereof and through the upper end of the first form of this valve mechanism illustrated in Figure 1.

Referring more particularly to the drawings I have shown the apparatus as including, generally, a heating unit 1, a pair of devices 2 and 2ᵃ acting at certain times as generators and at other times as absorbers, a condenser 3 and a refrigerating chamber 4. These various parts are referred to thus broadly simply for convenience in description and all will be described hereinafter in greater detail.

The heating unit may of course be varied within wide limits though it is here represented as comprising a shell or casing 5 at the upper portion of which is a tank 6 beneath and in communication with which is a coil 7 located above the burner 8 to which gaseous fuel is supplied through a suitable pipe 9. Extending through the tank 6 is any desired number of flues 10 leading to a chimney 11 for the escape of the products of combustion. In the present instance only one flue 10 is illustrated as such is entirely sufficient in so far as the general principles are concerned. This flue preferably has a corrugated wall to increase the radiating surface and there may be a flame spreader 12 within the flue for directing the flame against the wall thereof to avoid waste of heat. The upper end of the coil 7 communicates with the tank and there will of course be a circulation through the coil at all times the heat is applied. The intention is that the tank 6 be only partly filled with water as the quantity thereof in the system may vary to a certain extent and as the volume necessarily varies in accordance with its temperature. The water level may be ascertained by inspecting a gauge glass 13 mounted in a conventional manner. As an additional convenience the tank may also be provided with a pressure gauge 14 so that the operator may be at all times informed as to the conditions.

The primary control for the gas burner may consist of a thermostatic device or pressure operated device indicated at 15 interposed in the fuel supply line 9 and connected by a tube 16 with the tank 6. The tube 16 may connect directly with the top of the tank or it might connect with a bulb containing volatile liquid, depending upon the exact construction and the wishes of the manufacturer. Details such as these are considered immaterial to the essence of the invention. There is an additional automatic control for the gas supply which will be described hereinafter at the proper place.

The devices 2 and 2ᵃ are located conveniently with respect to the heating unit 1 and are preferably arranged at substantially opposite sides thereof though naturally this might be varied if desired. Each of the devices 2 and 2ᵃ is shown as comprising a shell or tank containing an aqueous solution of ammonia. If any other liquid and gas are found to be suitable for the purpose it is of course obvious that they could be employed instead of the ammonia solution. Within each of the devices 2 and 2ᵃ is a coil 17 here indicated as of the double type though this is a manufacturing detail or a matter of design which may be modified if preferred. The upper ends of the coils in the two devices 2 and 2ᵃ are connected by pipes 18 and 18ᵃ with valves indicated generally at 19 and 19ᵃ, these valves being in turn connected with the tank 6 by pipes 20 and 20ᵃ. The valves have also connected therewith pipes 21 and 21ᵃ leading to the sewer. The lower ends of the coils 17 in the devices 2 and 2ᵃ are connected through check valves 22 and 22ᵃ with the lower end of the coil 7 and are also connected through check valves 23 and 23ᵃ with a supply pipe leading from a suitable source of water under pressure.

It is contemplated that the solution in the two devices 2 and 2ᵃ be heated in alternation by passage of hot water from the heating unit through the coils 17 for driving off the ammonia gas. The arrangement is that while one is being heated the other will be cooled for reabsorbing the gas previously driven off from the other one and this action is accomplished by circulating hot water through the coil 17 for a certain length of time or until the liquid therein reaches a certain temperature, then cutting off the circulation of hot water and passing cold water through the same coil. The gas driven off is conducted to the condenser 3 where it is liquefied and the liquid is then passed through the necessary expansion valve and expansion coil and the gas then returned to the devices 2 or 2ª as the case may be. The manner in which these various things may be accomplished will be described more specifically hereinafter.

The valve devices 19 and 19ª are similar in construction so that a description of one will suffice. Each of these comprises a suitable body 25 having threaded openings into which the pipes 18 or 18ª, 20 or 20ª and 21 or 21ª are secured. This body is so formed as to provide chambers 26, 27 and 28 separated by partitions 29 and 30. Extending across the chamber 27 is a diaphragm 31 clamped in place by a removable head or cap 32. The partition 29 is formed with an opening 33 and the partition 30 is formed with a similar opening 34, both being in alinement and adapted to be closed by valves 35 and 36 respectively. The valve 35 is carried by a stem 37 which projects beyond both sides thereof, the upper end being slidably mounted within a tubular guide 38 threaded into a tubular retaining member 39 which is necessarily detachably connected with the body to permit assembly of the parts, particularly insertion of the valve. A coil spring 40 is interposed between the top of the valve 35 and the lower end of the guide 38 for normally holding the valve seated and the tension on this spring may be varied by screwing the guide 38 in or out. It is preferable to provide a closure cap 41 which is engaged upon the retaining member 39 and which extends over and engages the upper end of the guide 38. The valve 36 is carried by a stem 42 which is suitably secured to the center of the diaphragm 31 and which has a projecting portion slidable through a guide opening in the cap or head 32, the projecting portion carrying a disk or other abutment element 43 engaged by one end of a spring 44 which has its other end abutting against the cap or head 32. At the top side of the valve 36 is formed a tubular stem portion 45 slidably receiving the inner or lower end of the stem 37 so as to permit a certain relative movement of the valves 35 and 36. It is conceivable that there need not be relative movement but it may be preferable under some circumstances to provide for it. The purpose in providing the diaphragm 31 is to avoid placing any reliance upon a packed joint and it will be noted that the stem 42 comprises sections secured upon opposite sides of the diaphragm so that the diaphragm will act to prevent the bringing of any water pressure on the head 32.

The valves 19 and 19ª control the admission of hot water and cold water to the coils in the combined generators and absorbers. To effect proper operation of these valves at the correct time, I provide a thermostatic mechanism here represented as including a bulb or the like 46 within each device 2 and 2ª filled with a liquid capable of volatilizing at a certain desired predetermined temperature, these bulbs having connected therewith tubes 47 and 47ª which communicate with respective bellows 48 and 48ª located within suitable containers or housings 49 and 49ª and carrying rods 50 and 50ª which have pin and slot connections 51 with a lever or walking beam 52 which is centrally pivoted as for instance upon the bracket structure 53. The ends of the lever or walking beam are adapted to engage against the lower ends of the stems 42 for controlling the opening and closing of the valve elements 35 and 36. As a slow movement of these elements is undesirable I have provided an arrangement of links 54 and a spring 55 so related with respect to one another and the bracket and walking beam that when the walking beam or lever is moved upwardly or downwardly to a certain predetermined extent the pivotal connection with the adjacent link will pass beyond center, thereby causing the walking beam and consequently the valve elements to complete their travel quickly and with a snap action.

In the operation up to this point, let it be assumed that the walking beam or lever 52 is in the position shown by dotted lines in Figure 1 and that it is desired to heat the solution within the device 2. As the left end of the lever or walking beam is then in its lowered position the valve element 35 is seated and the valve element 36 unseated. Hot water then passes from the tank 6 of the heating unit through the pipe 20 into the chamber 27 and thence through the opening 34 into the chamber 28 and through the pipe 18 to and through the coil 17, the return flow being through the check valve 22 to the lower end of the coil 7. As long as there is a flame at the burner 8 there will be a constant feed or flow of hot water. When the temperature of the solution in the device 2 reaches a certain degree the liquid within the bulb 46 will volatilize creating a pressure within the bellows 48 and causing expansion thereof. The rod 50 will then be moved upwardly rocking the lever or walking beam 52 upon its pivot. As soon as the pivotal connection of the left end of the lever or walking beam with the adjacent one of the links 54 goes above the horizontal line across the pivot point of the lever and the pivotal connection of the links 54 with each other the spring 55 drawing the vertical link 54 toward the center of the walking beam or lever will cause the left end of the lever to be moved upwardly an additional amount with considerable rapidity or with a snap. This results in upward movement of the stem 42 against the resistance of the spring 44 and the resilience of the diaphragm 31. Just before the valve element 36 seats within the opening 34 the upper end of the tubular sleeve 45 will engage against the underside of the valve element 35 and lift it off its seat 33 against the resistance of the spring 40. The seating of the valve element 36 cuts off the flow of hot water to the coil 17 and the unseating of the valve element 35 permits cold water to flow from the pipe 24 through the check valve 23, coil 17, pipe 18, chamber 28, opening 33, chamber 26 and out through the pipe 21 to the sewer. When the valve device 19 is operated in this manner the valve 19$^a$ is operated in the reverse manner so that as hot water is circulated through the coil 17 in the device 2 cold water will be circulated through the corresponding coil in the device 2$^a$, and vice versa. By the cooling of one device 2 or 2$^a$ while the other is being heated it is apparent that the one being cooled will act as an absorber while the one being heated acts as a generator. The two devices therefore operate in alternation by the automatic control means above described, the entire action being governed by the expansive effect of the volatile liquid used in the thermostatic bulb 46.

Connected with the upper portions of the combined devices 2 and 2$^a$ are ammonia gas conducting pipes 56 and 56$^a$ within which are interposed upwardly opening check valves 57 and 57$^a$ which may be of any ordinary or preferred type but which may conveniently be of the specific construction disclosed in my co-pending application filed on even date herewith. The pipes 56 and 56$^a$ connect with a pipe 58 which leads to the condenser 3. This condenser comprises a suitable shell or casing within which is a cooling coil 59 here represented as of the double type. Water is supplied to this coil from an inlet pipe 60 within which is interposed an automatic regulating valve 61 which is responsive to the pressure in the condenser so that the water flow will be in proportion to the pressure. This valve 61 is not shown in detail as it is fully illustrated in my application filed on even date herewith and also in my co-pending application Serial No. 203,435, filed July 5th, 1927 and also in my earlier co-pending application Serial No. 187,622, filed April 29, 1927. The coil 59 is connected with an outlet pipe 62 which leads to the sewer. Leading from the bottom of the condenser 3 is an outlet pipe 63 for the liquefied gas, this pipe leading to an expansion coil 64 in the refrigerating chamber 4, an expansion valve 65 of any ordinary or preferred type and an auxiliary control valve 66, the latter located within the refrigerating chamber, being interposed in the connection. The expansion coil connects with pipes 67 and 67$^a$ which lead to perforated or otherwise apertured rings or the like 68 located within the bottom portions of the devices 2 and 2$^a$. Interposed in the pipes 67 and 67$^a$ are float operated control or check valves 69 and 69$^a$ which are not illustrated in detail but which are fully disclosed in my co-pending application filed of even date herewith. The purpose of these valves 69 and 69$^a$ is to prevent liquid within either of the devices 2 or 2$^a$ from passing back up through the pipes 67 or 67$^a$ and thence into the expansion coil, the construction being such that these valves will be closed by liquid pressure beneath them though they open when the pressure above the valves builds up sufficiently to exceed the liquid pressure beneath them. This latter mentioned action is necessary to permit the expanded gas to return to the devices 2 and 2$^a$ in alternation so that it will be reabsorbed into the liquid.

To check the driving off of the ammonia gas so as to prevent a greater amount than is desired from entering the condenser 3, I provide a novel automatically acting valve device within the condenser for controlling the entrance of gas. In Figure 1 I have illustrated one embodiment of this feature and referring thereto the numeral 70 designates a valve body mounted within the top of the condenser shell, preferably at the center of the removable cover thereof, this body having an opening therethrough and a valve seat 71 adapted to be engaged and closed by a valve element 72 carried by a stem 73 slidable through a frame 74 depending from the body 70 or otherwise suitably mounted. Beneath the frame the stem carries a float 75 the vertical position of which depends upon the level of the liquefied gas within the condenser. As it is intended that this valve mechanism have a snap action, I have shown a pair of leaf springs 76 secured at their upper ends to the upper portions of the frame 74 and having their lower ends pivotally connected with links 77 which are in turn pivotally connected to each other and to the stem 73. Clearly, when the liquid level within the condenser rises the float 75 will likewise rise. When the pivotal connection of the links with the stem 73 passes above the horizontal line drawn through the pivotal connections of the links with the springs, or goes past center with respect to the toggle arrangement, the springs 76 acting to force the outer ends of the links toward each other will cause the stem 73 to move upwardly an additional distance with rapidity so that the valve 72 will be brought positively into engagement with the seat 71 for preventing the entrance of additional gas into the condenser. To insure proper seating and centering of the valve element 72 with respect to its seat, it is preferable that it have a certain limited movement with respect to the stem 73. In Figure 9 I have illustrated a means whereby this may be accomplished. Referring to this figure it will be noted that the upper end of the stem 73 is formed with a head 78 received within a recess 79 in the valve element 72 and prevented from withdrawal by a sleeve 80 screwed into the recess. As the sleeve is of less length than the recess it is apparent that there will be sufficient space at both sides of the head 78 to permit the necessary play. The valve element 72 is normally urged upwardly by a spring 81 abutting beneath it and against a disk or the like 82 held on the stem by any suitable means.

In the event that too great an amount of gas enters and is liquefied within the condenser, resulting in rising of the float 75 and seating of the valve element 72, pressure will build up in the pipes 58 and 56 and as this pressure cannot reenter the devices 2 and 2ª, owing to the provision of the check valves 57 and 57ª, it is desirable to provide relief means to permit escape of gas in case the pressure becomes dangerously excessive and for this reason I have shown a pipe 83 connected with or forming a continuation of the pipe 58 and leading to a safety valve 84 having a discharge pipe 85 leading to the sewer. This valve 84 is not illustrated in detail for the reason that all the features thereof are shown and described in my companion application filed of even date herewith. However, the intention is to utilize the pressure building up in the pipes 56 and 58 for controlling the driving off of ammonia gas from the device 2 or 2ª and as the pressure will build up very rapidly owing to the small size of the pipes it is apparent that a very quick adjustment or control may be had. To take advantage of this pressure I provide a valve device indicated generally by the numeral 86 and shown in detail in Figure 7. This valve comprises a body 87 of hollow form having secured thereto a cap or head 88, with a diaphragm 89 clamped between them. The chamber 90 above the diaphragm has the same pressure therein as the pipes 56 and 58 inasmuch as communication is established through a tube 91 which connects with the pipe 58. Connected with the lower portion of the body 87 is a pipe 92 which leads to the source of fuel gas supply and this pipe communicates with a chamber 93 within the intermediate portion of the body. The fuel supply pipe 9 communicates with this chamber as clearly indicated. The numeral 94 designates a valve seat between the points where the pipes 92 and 9 communicate with the chamber 93 and cooperating with this valve seat is a valve element 95 carried by a stem 96 slidable through a guide 97 in the intermediate portion of the body and secured to the center of the diaphragm. A coil spring 98 surrounds the stem and abuts against the diaphragm and the guide 97 for the purpose of normally holding the valve 95 unseated. When the valve controlling entrance of ammonia gas to the condenser closes as above described the pressure which quickly builds up in the pipe 58 will enter the chamber 90 and flex the diaphragm 89 downwardly against the resistance of the spring 98, thereby closing the valve 95 to a greater or less extent and reducing or cutting off the flow of fuel gas to the heating unit. Naturally this will result in a reduction or cessation of outflow of ammonia gas from the device 2 or 2ª as the case may be.

It will be noted that the condenser, the expansion valve and the connections therebetween are so arranged that only liquefied gas can pass to the expansion valve. The expansion valve 65 may itself be of any ordinary or preferred type and is intended to function in the usual manner. However, as I prefer to have an accurate control of flow of gas through the expansion coil 64 so that the temperature within the refrigerating chamber 4 may be regulated with certainty, notwithstanding different conditions which may exist, I make use of the auxiliary control valve referred to above by the numeral 66. This valve is located within the refrigeration chamber between the expansion valve and the expansion coil and is thermostatically operated in accordance with the temperature changes within the refrigerating chamber 4. This valve is disclosed in detail in Figure 4 and is represented as comprising a body 99 having a suitable inlet 100 and an outlet 101 for the necessary pipe connection. This body is formed with a partition 102 which divides the interior into chambers 103 and 104, the former communicating with the inlet and the latter with the outlet. Extending across and closing the bottom of the chamber 104 is a diaphragm 105 clamped against the underside of the body by a head 106 secured in place in any desired manner. This head is shown as provided at its underside with a circular flange 107 within which is screwed or otherwise fastened a shell 108 containing a bellows 109 which communicates with the space 110 beneath the diaphragm through a passage 111. The shell has a nipple 112 thereon with which is detachably connected a bulb 113 containing a suitable fluid incapable of freezing. The nipple 112 is formed with a passage 114 establishing communication between the bulb and the interior of the shell 108. To avoid frosting of the bulb 113 I prefer to enclose it within a shell 115 containing a suitable non-freezing solution or liquid, the shell 115 being detachably connected with the shell 108 as for instance by means of spring fingers 116 which engage within depressions 117.

Secured within a suitable opening in the partition 102 is a member 118 formed with an opening therethrough and having a valve seat 119 with which cooperates a valve 120 carried by a stem 121 which is secured centrally to the diaphragm. A second stem 122 is connected with the center of the underside of the diaphragm and the closed lower end of the bellows. The valve 120 is of course moved in accordance with the expansion and contraction of the bellows 109. The purpose of the diaphragm is to eliminate any necessity for the employment of packed joints as for example where the stem 122 slides through the head 106. The upper end of the stem 121 projects above the valve 120 and is slidable within a guide member 123 which is screwed into an upstanding threaded nipple 124 on top of the body. Engaging about the stem 121 and abutting against the top of the valve 120 and the underside of the guide 123 is a spring 125 which may be adjusted as to tension by rotating the guide 123. It is a feature of convenience to provide the upper end of the nipple 124 with numerals or other indicia with which cooperates a pointer on the upper end of the guide member 123, as shown in detail in Figure 6, so that by turning the guide member 123 to bring the arrow or other pointer thereon opposite a certain numeral on the nipple the operator or attendant may accurately adjust the spring 125 for controlling the opening of the valve 120. The guide 123 may have its upper end formed with a slot to receive a screw driver to effect turning and it is preferable to provide a cap 125ª threaded onto the nipple 124 for closing the same and covering the guide. Clearly, if the tension of the spring 125 be increased it will be more difficult for the valve 120 to open and it therefore will not open until the temperature within the refrigerating chamber 4 is raised. Ordinarily the valve 120 is partly open so that ammonia gas may pass through the expansion coil 64. If the temperature within the refrigerating chamber drops below the desired degree the contraction of the liquid in the bulb 113 will cause elongation of the bellows 109 and closing of the valve 120. If the temperature becomes too high the pressure within the bulb 113 acting upon the bellows 109 will exert a collapsing effect thereon so that the valve 120 will be opened. This mechanism is therefore automatic in its action.

In Figure 8 of the drawings I have illustrated a modification of the float valve structure in the condenser though the general principles are substantially the same as illustrated in Figure 1. Referring to Figure 8 in detail it will be observed that the top of the condenser shell carries a body member 126 having an opening and valve seat 127 therein adapted to be closed by a valve 128 corresponding to the above described valve 72 and carried by a stem 129 corresponding to the stem 73. A frame 130 similar to the frame 74 depends from the member 126 and secured to the sides thereof are leaf springs 131 at the lower ends of which are journaled rollers 132. A float 133 is located beneath the frame 130 and is equipped at its lower end with a valve 134 designed to close the outlet to the expansion valve. The float is carried by a stem 135 which is adjustably or detachably connected with the lower end of the stem 129 as by a turnbuckle arrangement 136. The stems 129 and 135 may consequently be adjusted for varying the combined length or, if desired, the stem 135 may be replaced by one of different length so as to increase or decrease the distance between the active faces of the valves 128 and 134. The stem 129 carries a transversely grooved sleeve 137 within the successive grooves of which the rollers 132 may engage.

In the operation of the modification shown in Figure 8 it will be seen that if there is no liquefied gas in the condenser the valve 134 is closed so that gas alone cannot pass to the expansion valve. When liquefied gas accumulates within the condenser the float 133 will rise, the rollers 132 snapping out of the topmost groove and engaging within the intermediate groove in the sleeve 137 and both valves 134 and 128 will be open, permitting inflow of ammonia gas and outflow of liquefied gas. If the level of liquefied gas within the condenser raises to too great an extent, indicating the driving off of an excessive quantity from the generator 2 or 2ª, the valve 128 will close the seat 127, cutting off the admission of gas to the condenser. The rollers 132 will then of course snappingly engage into the lowermost groove in the sleeve 137. When the level is subsequently lowered the valve 128 will be unseated and if there is no liquefied gas in the condenser the valve 134 will seat. This float structure therefore accomplishes a twofold purpose.

In the operation of the system as a whole, it will be apparent that the devices 2 and 2ª are heated and cooled in alternation as described. When either is heated the ammonia gas in the solution therein will be driven off through the check valve 57 or 57ª, and pipe 56 or 56ª into the pipe 58 from which it will ordinarily pass into the condenser 3 where the gas will be liquefied by pressure combined with the cooling effect of the water coil 59. Liquefied ammonia passes from the condenser through the pipe 63 and to the expansion valve 65 where it returns to its normal gaseous form subsequently to which it passes through the thermostatically operated auxiliary valve 66, and then through the expansion coil 64 and float valve 69 or 69ª through the pipe 67 or 67ª and out through the distributing ring 68 in the bottom of the device 2 or 2ª as the case may be. While one combined generator and absorber is functioning as a generator the other functions as an absorber as it is cooled and the ammonia gas driven off from one is therefore reabsorbed into the liquid within the other. Inasmuch as the two devices operate intermittently and in alternation the final result will be a substantially continuous flow of ammonia gas to the condenser so that there will be no interruption to the operation.

From the foregoing description and a study of the drawings it will be apparent that I have thus provided an extremely efficient apparatus for the purpose specified and one which on account of the automatic nature of the various controls should require little if any attention and should moreover have an extremely long life. It is believed that the construction, operation and advantages will be readily apparent to one skilled in the art without further explanation.

While I have shown and described the preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described my invention, I claim:

1. In an absorption refrigeration apparatus, the combination of a pair of alternately acting combined generators and absorbers each containing an ammonia solution, a coil within each of said combined generators and absorbers, closed circuit means for passing a heating fluid through said coils in alternation, open circuit means for passing a cooling fluid in the opposite direction through said coils in alternation with the flow of the heating means, a single thermostatically operated valve means for each combined generator and absorber for controlling the flow of said heating means and cooling means, a condenser receiving ammonia gas driven off from said combined generators and absorbers in alternation, an expansion coil located within a refrigeration chamber, an expansion valve between the condenser and expansion coil, and means for returning the expanded ammonia gas to the combined generators and absorbers during cooling thereof and diffusing the gas into the exhausted solution.

2. In an absorption refrigeration apparatus, a container for a solution of ammonia, an upstanding coil within the container, means for passing a heating fluid downwardly through said coil, means for passing a cooling fluid upwardly through the coil, and a single thermostatically operated valve means for controlling the respective flows.

3. In a refrigeration apparatus, a pair of containers having ammonia solution therein, a coil within each container, a supply of heating fluid, a supply of cooling fluid, single valve means for controlling flow of heating fluid and cooling fluid successively in opposite directions through said coil in each container alternately, a lever mechanism connected with said valve means, and thermostatically controlled pressure operated means for actuating said lever mechanism.

4. In a refrigeration apparatus, a pair of containers having a solution of gas therein, a coil within each container, means for passing heating fluid and cooling fluid successively through the coil in each of said containers in alternation, said means including valves, a lever pivoted at its center and having its ends operatively engaged with said valves and arranged for snap action, a thermostatic expansion device within each container, and expansible members connected with each of said expansion devices and connected with said pivoted lever at opposite sides of the pivot thereof.

5. In a refrigeration apparatus, a container having a gas solution therein, a coil within the container, a source of hot water under pressure in closed circuit with said coil, a source of cold water under pressure having check valved connection with the coil, temperature responsive means, a valve mechanism operated by said temperature responsive means connected with the coil, said valve mechanism operating alternately to establish or cut off passage of hot water or cold water through said coil in opposite directions.

6. In a refrigeration apparatus, a container having a gas solution therein, a coil within the container, a source of hot water under pressure, a source of cold water under pressure, temperature responsive means, a valve mechanism operated by said temperature responsive means connected with the coil, said valve mechanism operating alternately to establish or cut off passage of hot water or cold water through said coil in opposite directions, said valves comprising a body having a chamber connected with one end of the coil, the other end of the coil having a check valved connection with the source of cold water said body having separate chambers therein connected respectively with the source of hot water and a waste pipe, partitions within the body defining said chambers and formed with openings and valve seats, valves cooperating with said seats, spring means opposing movement of said valves in one direction.

7. In a refrigerating apparatus, a combined generator and absorber, a condenser connected therewith, an expansion coil and an expansion valve in series with each other and with the condenser, the expansion coil having a liquid level closed and pressure opened valve connection with the generator absorber, a coil located within the generator absorber, a boiler to which the lower end of said coil is connected through a check valve, a cold water supply pipe having check valved connection with the lower end of said coil, a valve connected between the upper end of the coil and the boiler, the boiler and coil being in a closed circuit, a waste pipe for cold water connected with the valve, said valve being adapted to establish communication selectively between the coil and the boiler or between the coil and said waste pipe, and a thermostatically operated link and lever mechanism responsive to temperature changes in the absorber generator for controlling the position of the valve.

In testimony whereof I affix my signature.

THOMAS K. MARBURY.